United States Patent
Boudville

(10) Patent No.: US 10,625,854 B2
(45) Date of Patent: Apr. 21, 2020

(54) DRONE INTERACTING WITH A STRANGER HAVING A CELLPHONE

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 187 days.

(21) Appl. No.: 15/731,829

(22) Filed: Aug. 10, 2017

(65) Prior Publication Data
US 2019/0047695 A1   Feb. 14, 2019

(51) Int. Cl.

| | | |
|---|---|---|
| *B64C 39/02* | (2006.01) | |
| *B60R 25/24* | (2013.01) | |
| *G05D 1/00* | (2006.01) | |
| *G06Q 30/06* | (2012.01) | |
| *G06Q 50/30* | (2012.01) | |
| *G06T 19/00* | (2011.01) | |
| *H04L 29/08* | (2006.01) | |
| *H04W 4/00* | (2018.01) | |
| *H04W 4/02* | (2018.01) | |

(52) U.S. Cl.
CPC ............ *B64C 39/024* (2013.01); *B60R 25/24* (2013.01); *G05D 1/0016* (2013.01); *G05D 1/0038* (2013.01); *G06Q 30/0645* (2013.01); *G06Q 50/30* (2013.01); *G06T 19/006* (2013.01); *H04L 67/025* (2013.01); *H04W 4/00* (2013.01); *H04W 4/023* (2013.01); *B64C 2201/126* (2013.01); *B64C 2201/127* (2013.01)

(58) Field of Classification Search
CPC ............ B64C 39/024; B64C 2201/126; B64C 2201/127; B60R 25/24; G05D 1/0016; G05D 1/0038; G06Q 30/0645; G06Q 50/30; G06T 19/006; H04L 67/025; H04W 4/00; H04W 4/023
See application file for complete search history.

(56) References Cited

U.S. PATENT DOCUMENTS

| | | | |
|---|---|---|---|
| 8,433,800 B2 * | 4/2013 | Chor ................... | G06F 16/9566 709/225 |
| 2013/0110815 A1 * | 5/2013 | Tankovich .......... | G06F 16/9535 707/711 |
| 2014/0024999 A1 * | 1/2014 | Levien ..................... | G05D 1/00 604/66 |

(Continued)

OTHER PUBLICATIONS

KR 20180042062, Park et al., dated Apr. 25, 2018 (machine translation).*

*Primary Examiner* — Courtney D Heinle

(57) ABSTRACT

A pedestrian with a cellphone is in a public area. He sees a drone airborne nearby. He rents the drone to control its actions. His phone shows a signal encoding his electronic address, like a phone number. The drone decodes and sends a message with an URL, deep link or linket. The latter is a brand of the drone owner that maps to a deep link. The deep link designates an app in an app store. He installs the app and interacts with the owner, taking control of the drone for a specified time. The app shows images from the drone camera. The drone can crowdsource public safety. And check the presence of players at locations in Augmented Reality games. It can distribute electronic prizes to players. It can distribute keys for cryptosystems. The drone can pick up data from users at different places. Drone-drone interactions can optimise drone routes. Drones can be used with a blimp and electronic billboards to increase crowd use of an app.

8 Claims, 11 Drawing Sheets

(56) References Cited

U.S. PATENT DOCUMENTS

| | | | |
|---|---|---|---|
| 2015/0154644 A1* | 6/2015 | Saxena | G06Q 30/0269 |
| | | | 705/14.66 |
| 2016/0241767 A1* | 8/2016 | Cho | H04N 5/23203 |
| 2016/0342934 A1* | 11/2016 | Michalik | G06Q 10/083 |
| 2017/0031355 A1* | 2/2017 | Jung | H04N 7/183 |
| 2017/0083979 A1* | 3/2017 | Winn | G06Q 20/3224 |
| 2017/0109814 A1* | 4/2017 | Boudville | G06F 16/9535 |
| 2017/0197710 A1* | 7/2017 | Ma | G05D 1/0676 |
| 2017/0293297 A1* | 10/2017 | Kim | G08C 17/02 |
| 2018/0130017 A1* | 5/2018 | Gupte | G06Q 10/0836 |
| 2018/0240330 A1* | 8/2018 | Choi | G08C 17/02 |
| 2018/0261109 A9* | 9/2018 | Foina | G08G 5/0026 |
| 2018/0265194 A1* | 9/2018 | Gauglitz | G06Q 50/10 |
| 2019/0103030 A1* | 4/2019 | Banga | G08G 5/0026 |

* cited by examiner

Jill: Hi, I'm Jill, running the drone.

Bob: Hi Jill, I'm Bob. What are you doing?

Jill: I want to check out the rooftop scene nearby.

Bob: Can I watch?

42  appId :// 23.120.1.210

43  apiId :// 23.120.1.210

44  [ Bob Wong ]

Figure 4

61  http://drone-rental.com 62  droneRentalApp :// 23.120.1.58

63  [ Rent Jill's Drone !! ]

Figure 6

DRONE INTERACTING WITH A STRANGER HAVING A CELLPHONE

REFERENCES CITED

"Apps everywhere but no unifying link" by C. Dougherty, New York Times, 5 Jan. 2015.
"Deep linking's big untapped potential" by M. Thomson, VentureBeat.com, 9 Aug. 2015.
"Generating and presenting deep links" by V. Tankovich et al, US Patent Application 20130110815 (Oct. 28, 2011).
"Smart link system and method" by J. Chor, U.S. Pat. No. 8,433,800, (28 Feb. 2011).
"Deep linking to mobile applications" by S. Saxena et al US Patent Application 20150154644 (Dec. 2, 2013).

TECHNICAL FIELD

The invention describes a drone and its operator interacting with a stranger having a cellphone.

BACKGROUND

Drones are now commonly used for civilian applications. They are continuing to improve in functionality. Regulations for how drones can be used are in a state of flux. While at any given time the laws about drones in a given country are fixed, this can be expected to vary over time. And laws in different countries about drones can and does vary.

For recreational purposes, a drone is often controlled by a user (who is usually the owner) on the ground. The user might have a controlling device like a tablet or cellphone. Currently in the US, the user must be able to see the drone. And the drone cannot fly directly over people unless they are part of a group using the drone.

The most common group use of drones might be drone racing. A group of users races drones across an obstacle course, in the presence of spectators.

BRIEF DESCRIPTION OF THE DRAWINGS

FIG. 3 shows a conversation between Jill and Bob.
FIG. 4 shows a deep link or linket in Bob's screen data.
FIG. 6 shows text that the drone can send to Bob's phone.

DETAILED DESCRIPTION OF THE PREFERRED EMBODIMENT

What we claim as new and desire to secure by letters patent is set forth in the following claims.

In this submission, the term phone means a mobile phone. And it includes the case of using the device known as a smartphone. More broadly, we will often describe a person using a phone. This can be extended to the use of other types of mobile electronic devices or wearable devices.

A drone is perhaps more formally known as an Unmanned Aerial Vehicle.

The submission has the following sections—
0] Motivation;
1] Basic scenario;
2] Interaction via a specified app;
3] Orientation of the phone;
4] Crowdsourced public safety;
5] Extensions;
6] Drone Rental;
7] Drone and Augmented Reality;
8] Checker;
9] Drone delivery of virtual items;
10] Distribute prizes or keys;
11] Drone pickup of virtual items;
12] Drone-drone interactions;
13] Blimp;
14] Billboard;
0] Motivation;

There is a user with a cellphone. Call him Bob. He is outside in a publicly accessible area. He looks up and sees a drone. A civilian drone, and not a weaponized military drone. It has a camera (possibly several cameras). He wonders one or more of several questions:
Who is operating it?
What is it doing? Yes, it's flying, but is it doing or going to be doing something more specific?
Can I communicate (ask) with the operator?
Can I see what it is seeing (through its camera)?
Can I control it? (aka. Can I rent it?)
1] Basic Scenario;

The situation in Section 0 is not the common one where Bob is the operator of the drone. Or where Bob is a friend of the operator, and the two of them (perhaps with other friends) have gathered to see and control the drone. In this submission, Bob does not know the operator, in general.

Figure 1:
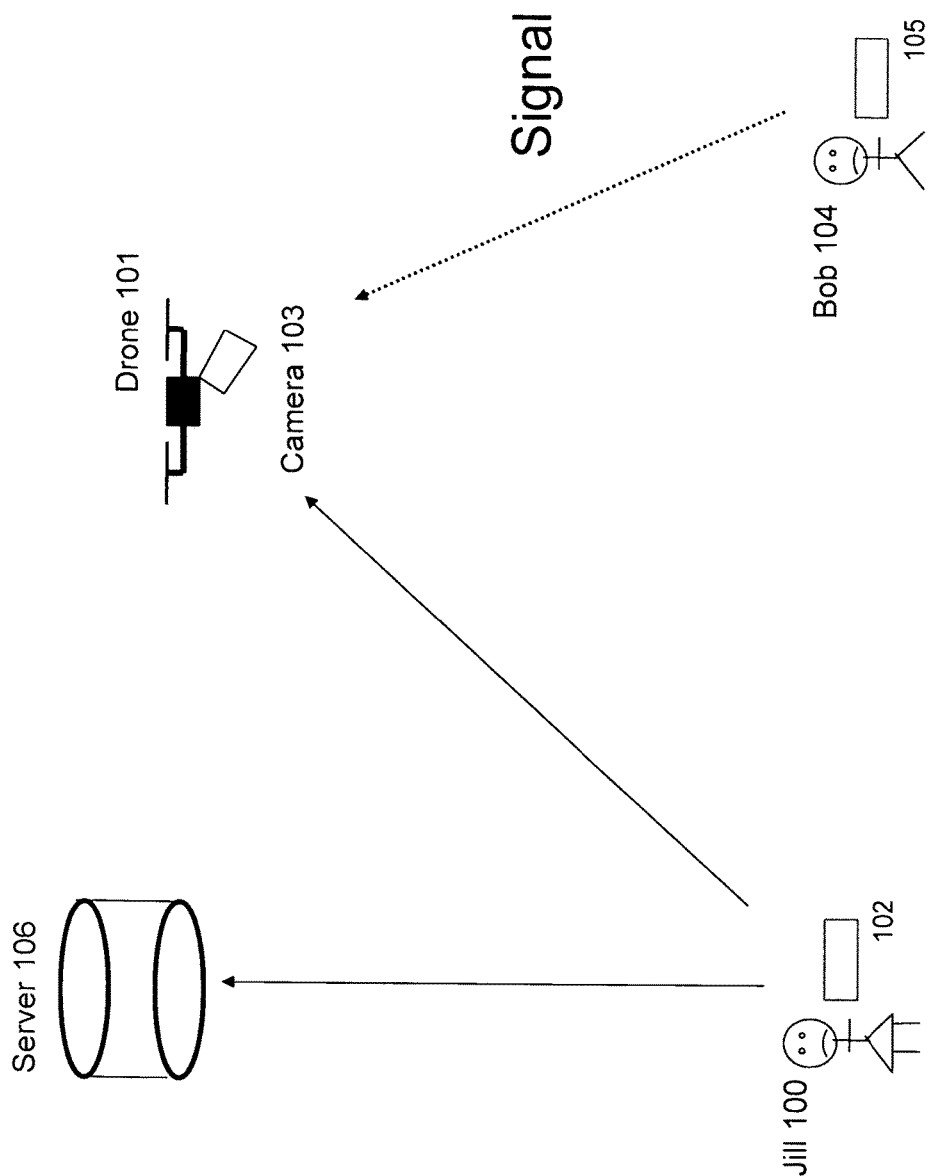
FIG. 1 shows a drone, its operator and a stranger with a phone.

See FIG. 1. It shows Jill 100 as the operator of drone 101. She has a computational device 102 with which she communicates with and controls the drone. Drone 101 has a camera 103. Device 102 can be a mobile phone, a laptop, a personal computer, a Heads Up Device (HUD), an Augmented Reality (AR) device or some other computational device. Device 102 might also be connected to the Internet, and thus to various servers. These are collectively indicated as Server 106.

The drone can also have Internet access. It has GPS or equivalent geolocation ability. For simplicity, GPS satellites are not explicitly designated in FIG. 1. Jill's device can find the drone's location and, for example, place it on a map on the device screen.

The drone is flying. Jill might not be in line of sight or within some specific distance from the drone. Currently in some regions, there may be regulations requiring one or both. But regulations vary with region and over time. For drones, the situation is in flux. Plus, there could be various categories of licenses. Jill can have a license as an experienced operator, letting her do the actions described in this submission.

The arrow from 102 to the drone in FIG. 1 indicates that device 102 controls the drone. This could be by 102 and the drone using standard radio methods. Or 102 could be accessing the Internet and likewise the drone accesses the Internet. Then both devices might be contacting, say, an app server at server 106 and interacting via that device.

Bob 104 has a cellphone 105. It is assumed that the phone has a screen and wireless connection to an electronic network. We take this network to be the Internet. While we say device 105 is a cellphone, it could also be other types of mobile electronic devices, like a tablet or a HUD.

Jill might be operating the drone in a purely recreational mode. Or perhaps the drone is patrolling an area. Akin to police choppers in an urban area. But the drone can complement the choppers and has some advantages over them. First, a drone is much cheaper than a chopper. A few thousand dollars versus several hundred thousand. Second, the cost of Jill's time is much less than than of the chopper pilot. In part because of the physical hazard to the pilot, while Jill is safely on the ground. The pilot needs more training. Third, the drone can fly at much lower altitudes than a chopper. Due to its size, the chopper has to fly higher to avoid power lines and buildings. To follow a suspect, the drone can be much lower and closer, making it harder for the suspect to get away.

On patrol, the drone could be operated by one or more of the police, fire brigade or ambulance services. This could be a joint operation. Or, non-exclusive to those, the drone could also be operated by a city department. Some cities have human guides who walk through the streets, to assist pedestrians. The drone might be a complement to those, just as it could be to the police choppers.

If the drone is deployed in these professional uses, it could be decorated with insignia perhaps visible to Bob that say 'police' or 'guide'. This can answer the first 2 questions of Section 0. But if the drone is operated by a private individual, the questions still stand.

Bob runs a program on his phone that shows a picture on the screen. He raises his phone with the screen possibly pointed towards the drone. Via its camera, the drone can have pattern recognition software that detects Bob's profile and attempts to decode the image on his screen. If it detects Bob's profile, eg. a person with a raised arm, it can assume that he is trying to contact to it via his phone screen. The drone can do one or more of these actions. It might get closer to him. It might zoom its camera (if the camera has zoom capability) onto the phone screen.

To aid the drone detecting Bob, his device might emit some combination of alternating visuals. Some cellphones have apps that let the phone act as a torch. Likewise, Bob's device could emit light in some pattern akin to an SOS signal. Though this submission explicitly discourages the actual use of an SOS. The latter should only be for emergency purposes. But, for example, his device could emit visual Morse code (long duration for a dash, shorter duration for a dot) by blinking the screen on and off. The code could represent a short signal.

Bob might orient his screen towards the drone, and he holds up the device. This combination of his posture, with the upraised arm holding a phone, and the emission of a pulsed signal can let the drone more easily detect Bob.

A variant is where Bob's device might also emit an audio signal.

The software run by the drone can be located in a combination of being in the drone and in Jill's controlling device 102. Some of the actions might also be done or initiated manually by Jill. For example, when the drone initially detects Bob's profile (say with his arm raised and holding what appears to be a phone), its software could flag this and alert Jill. She can decide whether the image suggests that Bob is trying to contact her and whether she wants to respond affirmatively. If the latter, then she might press 'yes' (or do whatever equivalent action is made available to her via her device), and the drone takes the above automated steps. Or, some of those steps might be manually done by her. In part, this could be when some steps have not be automated (yet), or because Jill overrides the automation for various reasons possibly external to this submission.

Figure 2:
FIG. 2 shows examples of the phone screen.
Figure 2:
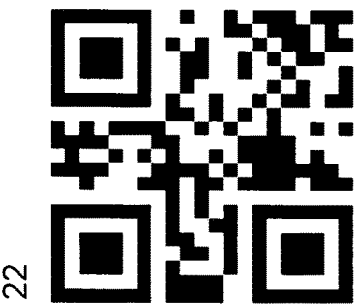
Figure 2:
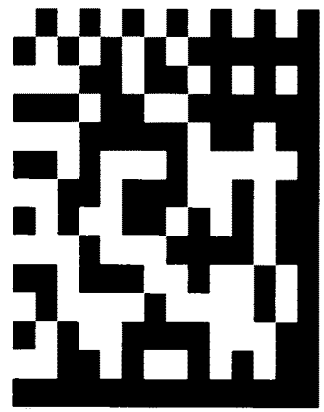

What is the visual signal on Bob's phone screen? See FIG. 2. Item 21 is simply a short text, like his phone number or other electronic address. Item 22 shows a QR code. Item 23 shows a Data Matrix code. The barcodes encode the same data as item 21.

(If Bob's phone had earlier shown some Morse code-type visual signal on its screen, then as the drone detects Bob, the program on his phone can replace that signal with other data in the format of the examples in FIG. 2.)

If the screen shows text, there is standard Optical Character Recognition (OCR) software that can decode it. If it is a barcode written in QR or Data Matrix or perhaps another barcode format, there is or can be expected to be standard decoding software available to the drone.

Suppose Bob's screen showed his phone number, either as text or decoded from a barcode. The drone can have software to ring his number and talk to him. The drone can have an automated assistant, akin to Amazon Corp. Alexa, or Apple Corp.'s Siri. Note that the drone's assistant is likely not to be on the drone. It runs on a server, which does not have to be and likely is not Jill's controlling device.

The assistant can then answer some or all of Bob's questions, using speech recognition to decipher his speech. For some questions, the assistant can contact Jill, who then manually talks to him.

If there is no assistant, the software on Jill's device can let her handle all the interactions by talking to Bob.

Or the assistant or Jill could interact with Bob via sending him text messages. He might respond by also sending text messages to them or by speaking into his phone. The latter might be easier for him under some circumstances.

FIG. 3 shows a possible interaction between Jill and Bob. This treats the input as either text or speech. Largely the submission treats these as equivalent.

We have a new type of social interaction. Between a drone operator and a stranger. This differs from a current common group situation using drones. A group of people gather together. One of them ("Jill") operates the drone. The others stand around and watch the drone. If they already in proximity, they can simply ask Jill without using their phones.

2] Interaction Via a Specified App;

The previous section had Bob giving his phone number on his screen, with the subsequent interaction being via text or speech. Other ways are described here.

The signal on his phone, in decoded form, could be the Internet address of his phone, with an optional port number. See item 41. The Internet address is the (likely) Internet Protocol Version 4 temporary address of his phone. A similar example could be given in IPv6 notation. There is an implied app that Jill can use on her device, or an implied Application Programmer Interface (API). If the latter, then there could be several apps that Jill can pick, all using that API.

She then interacts with Bob. The point about using the app or API is that the interaction is more than just the simple text or speech of previous section. Instead, there can now be a greater use of the graphics of the screens of their devices, and possibly other hardware features of the devices.

How does Jill know what implicit app or API to use? One case is if for drone interactions (or broader type of interactions), there has emerged a de facto app or API that is the market leader for such interactions. But suppose there is no such leader. Or, if there is but Bob wants to use a different interaction, requiring a different app by Jill. See item 42. It shows a deep link. This can be regarded as a generalized URL. It has the format of an app id, followed by "://" and then Bob's IP address.

Note that currently there is no industry wide accepted format or indeed definition of a deep link. The format depicted in item 42 is meant to be suggestive by mimicking that of a conventional URL. Other formats are possible.

For clarity, item 42 omits a port number. The app could have a hardwired default port. The "appId" string in item 42 symbolically designates an id of an application. This id could be with respect to an app store, for mobile or fixed devices.

Which app store? If Jill is using a mobile device, there are currently 2 major app stores, for Android and Apple. If Jill is using a PC, there could be other app stores. Clearly, item 42 could for example have an extra field, perhaps as the first field, with an id of an app store.

A variant is item 43. The first field is an id of an API (Application Programmer Interface). There is assumed to be a registry of APIs. This registry maps an API id to ids of apps in various app stores, where the apps all satisfy that API.

FIG. 4 has internal white spaces in the examples. There is no technical significance to this. They are simply for visual clarity in the figure.

An alternative to items 42 and 43 is for the raw network address to be replaced by a string. This string is mapped to an actual address at a server. A device using 42 or 43 would submit the string to the server and get the address. For simplicity this is omitted from FIG. 4.

Another variant is item 44. Bob shows or encodes on his screen his linket [Bob Wang]. In our US patent application 20170109814, "Linket to control mobile deep links", and later applications, we described a linket. It is a personal brand owned by a user, similar to him owning a conventional domain. The linket is written in Unicode (ASCII is a grandfathered subset of Unicode). It can have internal whitespace and can be case sensitive. The enclosing square brackets are arbitrary delimiters. The example could have equivalently been written as >Bob Wang<, or {{Bob Wang}} using other symbols as delimiters.

A linket maps to a deep link, where the deep link can be in the formats of items 42 and 43, for example. There is a linket Registry server on the Internet. It takes as input a linket. It returns the current corresponding deep link.

Consider items 42 and 43. They show the current Internet address of Bob's phone. Often it is temporary. He typically connects to the Internet via his phone carrier (e.g. in the US this could be ATT or Verizon) or via a nearby hotspot using WiFi or WiMax (e.g. in China). The problem is that the deep links of 42 and 43 are hard to remember. They have no intrinsic semantic value. And a second problem is that they are temporary. If Bob moves to a different location and in the context of this submission, he interacts with a different drone, he would have a different deep link in items 42 or 43.

In contrast, Bob's linket remains constant. Chosen by him so others can find it easy to remember. FIG. 4 depicts his choice as simply being his name. That is not required. He might have picked [Gamer Dude] for example, if he was a frequent game player, so we see that his name does not need to be in the linket.

Given the choices in FIG. 4, suppose Jill installs an app to interact with Bob. What can happen next?

Via his app, he might ask Jill for a video feed from the drone. He wants to see images from the drone's camera as it proceeds later. For example, suppose the conversation in FIG. 3 happened inside apps used by them. Bob is interested in seeing what Jill sees when she sends her drone to the rooftop. He might have been unaware of a party there. Or perhaps he was aware, but he could not get an invitation. Jill can use her device to grant him a full or partial video feed. Perhaps a partial feed if there are bandwidth constraints. By partial feed, this could mean say getting 3 frames a second instead of a full and higher frame rate.

She might require payment. She monetises her drone. In personal recreational uses of drones, apart from drone racing, there are currently few ways to make money. One utility of the submission is to describe such a method. The payment could be for a partial feed. If Bob wants a full feed, he pays more.

Suppose the drone also has a microphone; possibly directional. The discussion in the immediate previous paragraphs could have been confined to the video feed (full or partial) being just images. Whereas for Bob to get audio might entail another payment.

The app could also let Bob get a flight path of the drone. Either in 2 dimensions (in the horizontal plane with latitude and longitude) or in 3 dimensions (including altitude).

Depending on the app, this path could be shown overlaid on a street plan on his mobile device, if he is in an urban area.

Variants are possible. Suppose Jill operates the drone as part of her job working for the city, as discussed earlier. The flight plan could also be or include the regular path taken by the drone while on patrol, in addition to the current real time actual path it will take.

Another possibility is for Jill to let Bob take partial control of the drone. For payment. Another way to monetise. The attraction is to give people who do not currently have a drone a chance at operating one. Akin perhaps to go cart speedways at some amusement parks. The assumption is that the drone has built-in collision avoidance firmware. And Jill would likely maintain a manual supervision of the drone.

An analogy with current practices in some cities might be useful. In Los Angeles, for example, it is possible for a pedestrian to rent a bicycle with his credit card. There a racks of special bikes scattered throughout the city. He can borrow and return a bike. In the present submission, this corresponds to Bob outsourcing the ownership of a drone to third parties.

Whether or not Jill lets Bob might be predicated in whole or part by information about his part experiences (if any) with controlling drones. There might be data about this accessible to Jill's app.

Jill could also offer different regions accessible to Bob if he controls the drone. If he pays more, for example, he gets to control the drone over a larger area. The areas can be delimited and defined to the drone via geofences. It is already a common idea for off-limit areas (as defined by a government) to be built into a drone, so that its regular operator cannot fly into those areas. This submission lets the operator define extra areas as a means perhaps of garnering more revenue.

3] Orientation of the Phone;

Consider when Bob initially puts an image on his phone and he holds it up for the drone to scan. In the daytime, sunlight can make the screen hard to read. The drone could have firmware to let it maneouvre its location vis-a-vis the sun's location and the phone screen's orientation to let it more easily scan the screen.

Consider the phone. It knows the time and its location (via GPS). It can access a database or use a formula giving it the sun's location in the sky (azimuth and elevation) at that time. Now suppose the phone has a compass, so that it can tell its azimuth. And perhaps a sensor (like an accelerometer) so that it knows its elevation. The phone can find an optimal orientation and indicate to Bob via sound or vibration to hold it up around that orientation. For example, for the azimuth, which is the horizontal orientation, the phone can emit a varying pitch. Where in the desired optimum azimuth, the pitch is a maximum, and as Bob moves it away in either horizontal direction, the pitch falls. Likewise, for elevation, the phone might vibrate at a certain maximum frequency at the best elevation, and then stop once Bob holds it there.

Or instead of vibrating for elevation, the phone varies its sound volume around the optimal elevation.

4] Crowdsourced Public Safety;

Consider the case of Jill operating a drone for a city. One major use is public safety. Bob could be a witness to a hit and run, where a car has driven off. Perhaps he took a photo or a short video of it. In law enforcement a vital idea is the lag time between an incident and when it is reported. Reducing this can greatly improve tracking a suspect.

One use of city drones could be to have them patrol streets where police (in cars or on foot) are not currently. This supplements the safety coverage of a city.

Consider the photo or video that Bob took of a suspect or the suspect's vehicle. Why can't he just call the standard emergency number (911 in the US) on his phone? First, calling the number does not let him transmit the images or video. Second, there likely is no police near him currently. Time is of the essence. Suppose a drone approaches and he contacts it via the methods described earlier. He and Jill interact via an app that lets him upload the data. This can immediately be transmitted to law enforcement. Plus, the drone which perhaps now is under the active control of Jill, can be used by her to look for the suspect nearby.

A variant is where Jill is using the drone recreationally. Then via the app, Bob uploads the images of the suspect to her. She of her own volition searches for the suspect. If she sees the suspect or vehicle, she follows via her drone. Law enforcement typically does not encourage civilians to do so in person because of the chance of danger to them. But if she is not near the drone, there is little risk to her. It should be stressed that this is not vigilantism. Jill as a private citizen does not actively apprehend the suspect.

A boon to law enforcement and a key utility of this submission.

This drone use also supplements surveillance cameras in public locations and shops. Video data from those can be accessed by law enforcement but this can typically take a day or longer. The data is rarely available for active (real time) pursuit.

5] Extensions;

Section 2 described Bob being able to get a data feed from the drone near him. Or to partially control it. Suppose Jill controls a group of drones. If she interacts with him via a custom app, that app could let him pick which drone to watch or control. A straightforward extension of earlier section.

Thus far the interaction between Bob and Jill's drone has been initiated by him. A variant is where she manually initiates, or her drone via its automated procedures initiates the interaction. The drone could approach Bob. It could have insignia or logos or trademarks (we regard these terms as synonymous in this submission) that tell Bob he can interact with it. Similar to how taxis often have a well known brand or colour or logo, and they cruise busy streets. Pedestrians can then hail them.

In the current case, when the drone approaches near Bob, this can induce him to show it his phone screen.

6] Drone Rental;

In sections 1 and 2 and the associated figures, Bob described as passing to Jill a means of Jill (the drone operator) contacting him. Bob picks an app and he might have a label or brand, called a linket, via which Jill accesses. The current section describes an alternate scenario, where it is Jill who has a brand and Bob decides whether to interact. One motivation for him can be to rent the drone. The rental here does not require him to physically hold the drone. The drone can remain airborne and outside his reach. For the drone owner, this reduces the chance of a rogue Bob taking her drone.

Figure 5:
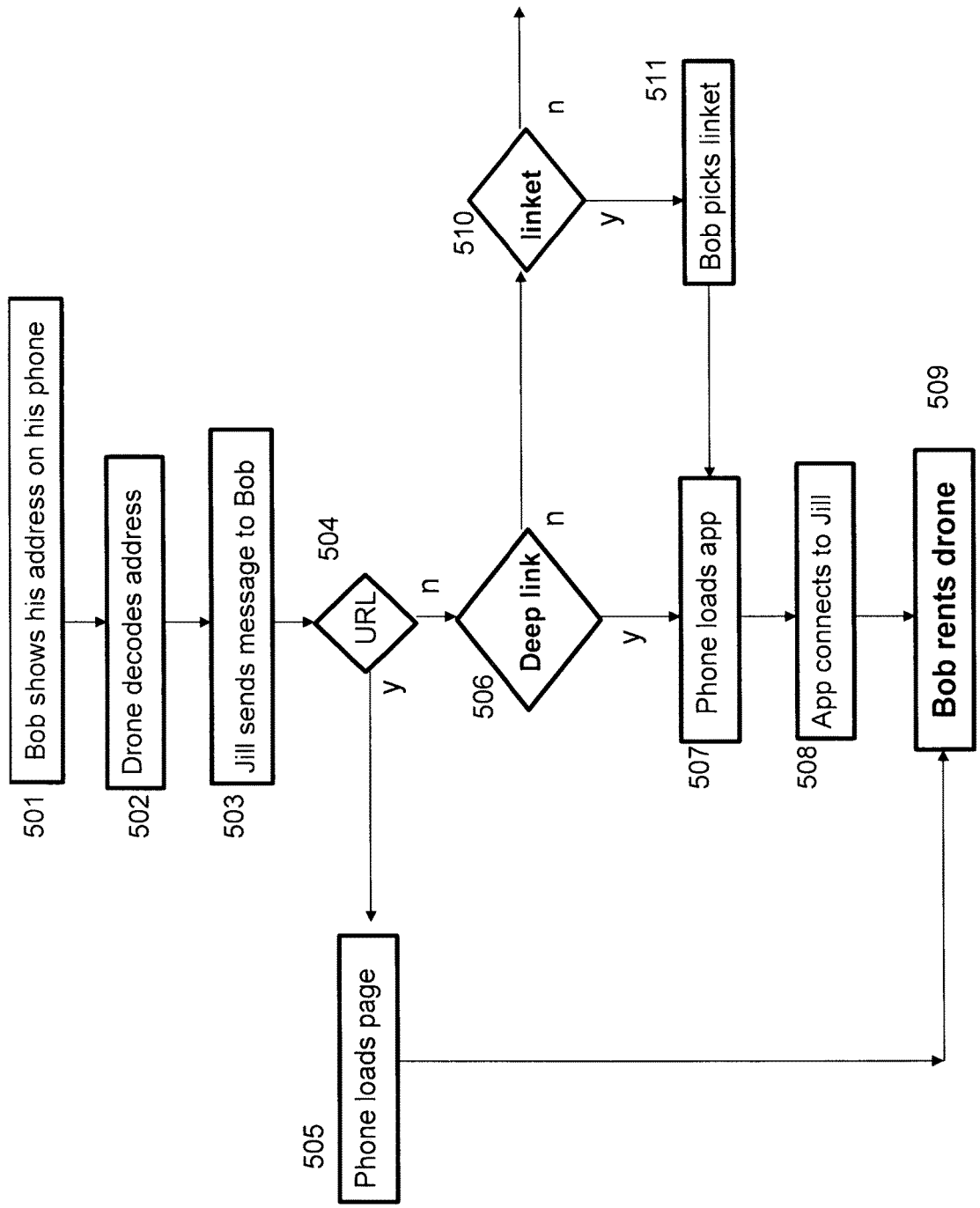
FIG. 5 is a flow chart of how Bob can rent Jill's drone.

See the flow chart in FIG. 5. Item 501 is Bob showing an electronic address on his cellphone screen. As earlier, this can be his phone number, for example. The address can be shown as plain text, or encoded as a barcode. Item 502 is the drone decoding it, using OCR (for plain text) or an appropriate barcode decoding method. When item 502 says the drone does this decoding, an alternate method is for Jill's controller device in FIG. 1 to do the decoding. If the drone decodes, it then sends the decoded address to Jill's controller.

Item 503 has Jill's controller sending an electronic message to Bob's decoded address. Suppose the latter is his phone number. The message can be sent as SMS or MMS. For SMS there might be a maximum character limit (perhaps 140 characters). For MMS the limit would be greater. Note that over time, the limits could increase or that SMS and MMS might become equivalent.

Or suppose item 503 has Jill sending the message to Bob's email address. In either case, Bob's phone gets the message and displays it. Item 504 asks whether the message is an URL. If so, we go to item 505, where his phone loads the page pointed to by the URL. An example of such an URL might be item 61 in FIG. 6. The page could show information about Jill's drone as well as other drones. The latter might be owned by other independent operators.

If the page shows several drones, then which is Jill's drone, which is near him? He does not want to control another drone at another location, presumably. Hence the URL 61 might in practice be a longer URL, pointing to a page just about Jill's drone.

If Bob finds the terms in the page agreeable, he could rent the drone in item 509. The financial mechanism is left outside the scope of this submission. It could involve traditional credit card or debit card means, or Paypal or a synthetic currency like Ethereum or Bitcoin.

In item 504, suppose the message is not an URL. We go to item 506. Is the message a deep link? If so, go to item 507. An example of a deep link is item 62 in FIG. 6. The droneRentalApp is a symbolic placeholder of an app id in a mobile app store that Bob's phone can use to install that specific app. The 23.120.1.58 is the temporary IPv4 address of Jill's drone or controller. Hence Bob's device can install this app if it is not already on the device, and then the app is run and contacts a program on Jill's controller in item 508. Bob uses the app to investigate the rental terms. These can include more information about the capabilities of the drone, like the number of cameras, the resolution, the color depth, the number of frames per second etc. If all is ok, he goes to item 509 to do the rental.

But in item 506, suppose Jill's message is not a deep link. Go to item 510. Is it a linket? If so, go to item 511. An example of a linket is item 63 in FIG. 6. Jill has a brand expressed as the linket. She owns the linket. Bob picks it in item 511. Leading to his device sending the linket to a linket Registry and getting back a deep link like item 62. We go to steps 507 and 508.

Thus far the flow chart has 3 key decision points, 504, 506, 510 that parsed Jill's message. Other types of structured data in her message are possible. These are implicitly given by the arrow for 'n' ("no") in item 510.

Bob's motivation in this section is not restricted to renting the drone. He might simply be curious about one or both of the drone and its operator.

The business in this section predicts a future where drone use and ownership are common; likely more common than now. But deliberately, use does not have to equate to ownership. Bob might actually have his own drone. But it is not with him when he sees Jill's drone. Plus there might be a specialisation in drone models. (Like for motor vehicles.) There could be common, cheap drones, and Bob owns one of those. But Jill has a more expensive drone, with perhaps longer flying time, or a higher resolution camera (or cameras). Or suppose that there are government regulations on drone usage, with average users like Bob being subject to more restrictions. Jill could have taken more extensive drone lessons and have a license that lets her rent out her drone, with perhaps her having a supervisory overriding role for safety. Bob might be able to use her drone under conditions that he cannot with his drone.

This section described how the drone controller, Jill, could show a linket of hers in the message sent to Bob. A variant is where the linket is a brand owned by a different entity. That entity might want Bob to download and use a given app. Its linket maps to that app. It hires Jill to fly her drone as advertising.

7] Drone and Augmented Reality;

Augmented Reality (AR) games have been popular; notably Ingress and Pokemon Go from Niantic Inc. Both have the property of associating entities ("portals" in Ingress and "monsters" in Pokemon) with real locations. Players go to those places and interact (e.g. "capture") with the entities and each other.

Now imagine a drone as an integral part of an AR game. Jill might be a player or she might be hired by the game company. In either case, she operates a drone as in FIG. 1. Bob is a player on the ground, and in general Bob and Jill do not know each other. Bob uses his phone to play the game. See FIG. 7. It shows Bob 70 with his phone (or other mobile or wearable electronic device) 71. A game runs on 71. It talks to its server 75.

One possibility is that when he sees a drone, he runs the game and points the phone camera at the drone. The game analyses the photo or a video of the drone's movement. When we say 'the game analyses', this can be done by the game app on Bob's device, or by the game server, where the game uploads the photo or video to its server. Hence, when we say the game does some analysis or action, this might be done at the level of the game app or at the game server.

The game has pattern recognition to deduce if the drone is in the game or not. Or the drone has visible insignia that Bob sees and tells him that it is in the game. If so, he might do some action in the game to tell it that he has manually detected a game drone.

In either case, the game could show some image associated with or near the present location of the drone. He might now have to "capture" or "shoot" the image. The image could represent a character in the game.

Why cannot the game just send the coordinates of his mobile device to the game server, which knows if and where any drones associated with the game are? This is possible, but the above assumes that the game requires Bob to do certain manual steps.

The difference with the earlier cited games is that those used characters tied to fixed locations. Now a character or entity (e.g. a refueling station for a player like Bob) can move. Jill's task could be to control the entity via flying the drone, where the players chase the entity or drone.

One scenario is that as the drone moves, Bob has to follow, so his game can continue to detect the drone and the entity associated with the drone location. Note that the entity does not have to overlap the drone location in the game. The entity could be displaced or offset from the drone. Specifically, the entity could be depicted as moving on the ground, under the drone.

Another scenario is that the entity does not move as the drone moves. Bob just had to 'capture' the entity based on a temporary location of the drone.

Suppose there are several drones in the game, each associated with a different entity. How does the game know which entity to display when a drone is seen? One answer is if the game does pattern recognition on the drone. Perhaps the different drones have different colours. So a red drone maps to a refueling station, while a blue drone maps to an ammo dump. Etc.

Thus far in this section, Bob has not directly connected to Jill. One way is for him to show an image on his phone screen, as in earlier sections. This has the advantage that it can tell Jill that Bob is playing. Otherwise unless Bob is (say) wearing a game costume (perhaps as cosplay), Jill cannot a priori tell Bob from a non-player.

Another scenario involves Jill playing the game. The game might be designed to let players use a drone as an extra mobile device, or the game might be restricted to only players using drones (along with their phones).

Consider Bob playing a popular current game like Pokemon Go. Bob plays using his phone, with its camera and GPS. The game on his phone knows its location via GPS. The game uploads the location to the server. The server sends information about any nearby monsters to the game. The game shows these on the phone screen, overlaid on a street map. For example, this could be Tiger 72. Server 75 associates this with area 73, also labelled as Alpha in FIG. 7. Tiger 72 wanders in Alpha.

Return to Bob. He controls his drone 76 via a mobile electronic device he is carrying. The drone has built in GPS by assumption. (In 2017 this assumption is de facto true.) The drone is also assumed to have a camera 77. The game app on his mobile device has been modified so that it takes its location not from his device GPS coordinates, but from the coordinates of the drone. Note that currently, when Bob controls the drone via his device, the drone sends its location regularly to his device. So the latter can, at the very least, show the drone's location on a map on Bob's device. It is a small step to then modify the game app to use the drone location.

Likewise some current AR games also might use a compass or gyroscope in the phone to deduce the direction that the phone is pointing. Where this might be defined as the direction of, say, the camera on the side of the phone opposite to the screen. The drone is likely to also know the direction that its camera is pointing. It is a small step to modify the game app to use the drone camera's orientation, instead of the orientation of the device 71 that the app runs on.

Hence Bob plays the game using as input the drone's location and orientation. (The latter being defined as the orientation of the drone's camera.)

We described how the game might be altered to allow this. A different method is for Bob's mobile device to have a program that acts as an intermediary. The game sends a query to the phone operating system for the phone's location and orientation. This query is received by the program, which replies with the drone's location and orientation. This program can perhaps be regarded as a 'container' or framework in which the game is played.

A game could be designed or altered specifically for different and new types of gameplay when drones are used. For example, a game could have monsters or portals at locations not easily accessible to players at ground level. A location could be a rooftop of a building 74. In a rural area, a location could be a flat area on the side of a mountain, where it is unsafe for players to climb to. Hence using drones can expand the types and locations of gameplay.

Figure 7:
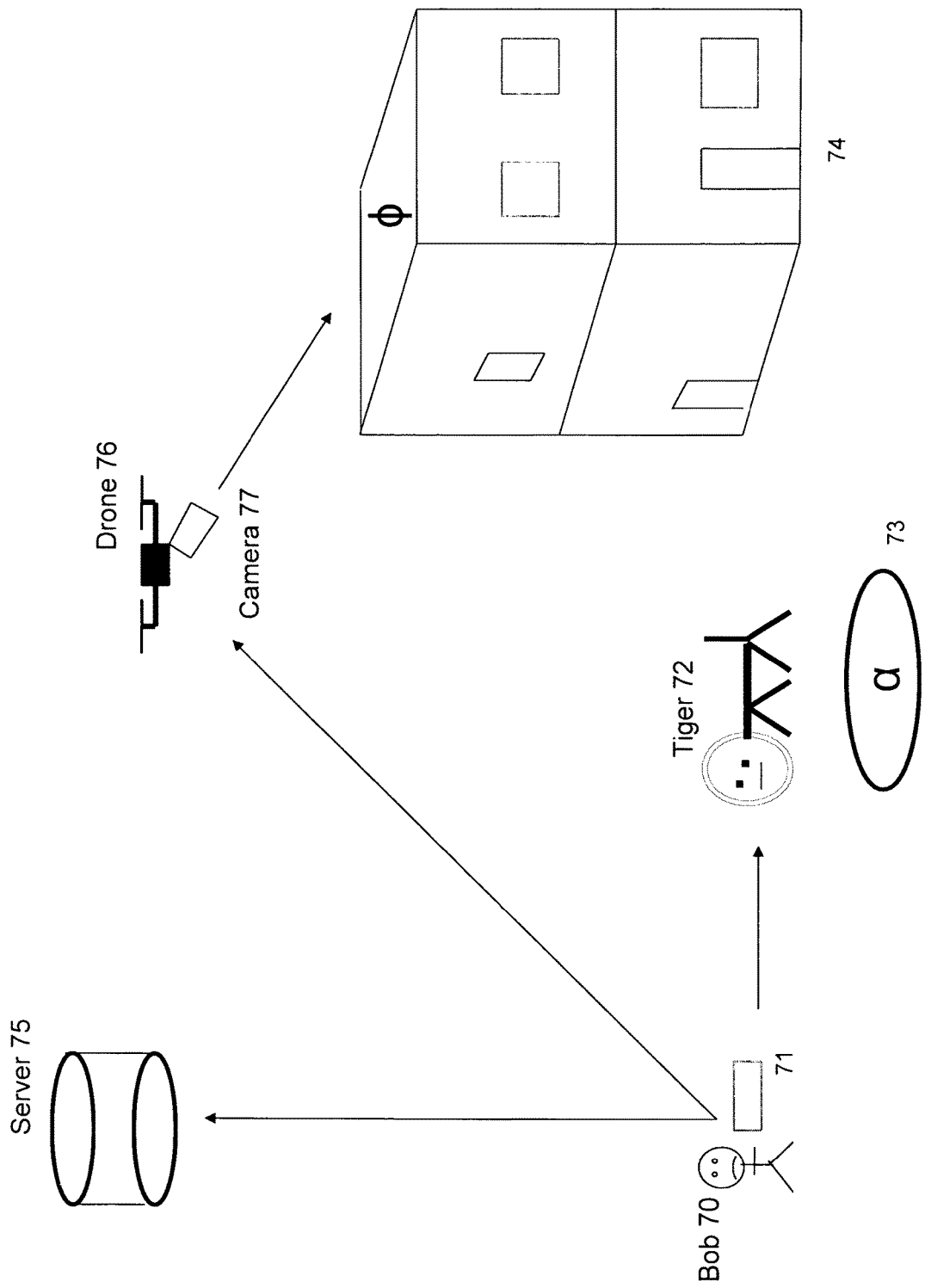
FIG. 7 shows a player with a phone and a drone in an AR game.

For example, in FIG. 7 Bob sees Tiger when he gets near location Alpha. A task in the game is for him to neutralise Tiger by moving it to a location where it cannot get at the players. By controlling drone 76, he directs it to hover near location Phi on the roof of building 74. He orients drone camera 77 to point at Phi and he can see images of Phi on his phone. Phi is vacant. The game lets him capture Tiger and move it to Phi.

There is another aspect here. The drone has a camera and GPS and orientation data. The GPS location is the location of the drone. Not necessarily that of Phi on the rooftop. But this is similar to the current situation of the phone's location. It is not necessarily that of Alpha. But just as current AR games can compensate for this mathematically, so too can the same methods be used for the drone. Essentially, given knowledge of the drone location and the direction of its camera, and some image recognition, a nearby area Phi can be detected by the game. Put plainly, knowing the drone location and a direction vector (the orientation of its camera), an actual location used by the game can be that drone location plus (meaning a vector addition in 3 dimensions) a displacement.

What is this displacement? The drone has the (x,y,z) of its location. It has an angle Theta of its camera orientation. The image from the camera shows a rooftop, say. But how far away is it? There are several answers. One is that the drone has a rangefinder, like a laser or sonar. Another is that various heuristics (rules of thumb) can be encoded in the game to give a plausible estimate of the distance. Or the game can use external databases, like Google Maps. These databases can have maps with building locations and elevations. In some cases, this can be used to find the displacement.

There can be many variations to using the drone in a game. Bob might need to have something visible on his phone camera and a different entity or location visible on the drone camera. When both conditions are true, he can do some action not otherwise possible. Like swap the entities. Or the entities remain at their locations. But the game lets Bob move some property from one entity to the other. The property could be gold coins, or a magic potion or a magic scroll.

Or the drone is used to bring characters into the game. There is no Tiger at Alpha in FIG. 7. But Tiger is at Phi. Bob uses the drone to search rooftops until he finds Tiger on the drone camera, shown as an AR overlay. He captures Tiger and releases it at Alpha. Now Tiger can perhaps be an obstacle to other players.

Or instead of Bob seeing Tiger in FIG. 7, he uses the drone to find a suitable rooftop Phi. Perhaps suitable is defined as him searching various high places until the game announces that he found Phi (Phi's location was pre-defined in the game). Simply finding Phi could give Bob some points in the game.

A variant is where a character might be initially visible on the ground to Bob using his cellphone. Then when Bob gets near it, it moves. But caution is required by the game designer, if the character moves at ground level in an urban environment. Suppose the character moves on the sidewalk but Bob sees it on his phone when he is across the street. If he is careless, he might chase it by running across the street without looking for traffic. Now in this submission, the character might be displayed inside a park, say, where it only appears on Bob's phone when he is also in the park and does not need to cross a road. Plus when the character moves, it climbs up some rocks or trees, so that it disappears from his phone screen. He must use a drone to chase it. Its image will only appear overlaid on the drone camera's screen. Safer for Bob.

By using a drone, the game can be extended to involving places not accessible to players in a public area. Qualitatively different from two players interacting in a public area in a game. Other examples of drone-only accessible areas could be the tops of tall trees, or private walled gardens.

While this section describes AR games, non-AR games can also be extended to use drones in the above ways. For decades there have been scavenger hunts. Clues were physically scattered around public areas, like the streets of a town. Players did not use phones. They had sheets of paper with instructions to find the clues. One clue might lead to another. These games were extended to geocaching games once mobile phones with geolocation became common. Geocaching let clues use lat-long locations. Clues did not have to be physically put at a location. Instead, in a geocaching game, when a player reached a given location as indicated by his phone, the game on the phone could emit text that was the clue. But in both cases players were restricted to areas accessible to the public.

A game running on Bob's cellphone could use exclusively a phone. Or it could let Bob alternate between sometimes just using the phone (on which the game front end runs) to play, and sometimes also using the drone in the manner described above. This can be when he rents the drone (perhaps but not restricted to the manner described in earlier sections) from its owner. The game can have a mode where he is limited to a maximum duration where he controls a drone. Or, aside from whatever he pays the drone owner to borrow the drone, when he uses it in the game, he might have to spend a game currency in the game. Maybe because a drone gives him extra powers in the game and thus in the game logic he has to expend resources to use it.

The game could allow different scoring for locations accessible only by drone versus locations accessible on the ground using a cellphone. Perhaps the drone locations are worth more points. Or a game might require that the players access a minimum number of drone locations and a minimum number of ground locations.

In more general terms, the above can be restated. A game runs on a game server and on corresponding game apps on mobile devices (usually phones) carried or worn by players. The devices have GPS and cameras. A player controls a drone. The drone has a camera and GPS. The drone camera images are shown on the phone. The server holds in memory characters in the game. The game app might also hold a subset of this data. Associated with each character are various attributes, including a location. The location can be given in 2 variables, like latitude and longitude. It could also have a third variable, altitude. A player uses the drone location to alter attributes of a character in the server. This includes in some cases the destruction or creation of a character. The drone gives players visual access to locations not otherwise accessible to the physical presence of players.

Another method is for the drone to be a mobile hotspot. It is now common for a cellphone to be able to be a mobile hotspot, letting nearby devices communicate with it via WiFi and thence to access the Internet.

The drone can spread the use of a mobile app, especially one intrinsically for outdoors use. In the 2 main app stores, Apple and Android, there are currently about 2 million apps in each. A major problem each app faces is simply to stand out amongst its peers. The app firm can hire a drone to fly around open areas having people. By the methods of this submission the intent is for users to interact with the drone and install and run the app. The drone is used for both publicity and distribution. It acts as a new mechanism for the app to garner awareness and use.

As part of the publicity, if a user Bob were to interact with the drone and download the app, he might get bonus points compared to someone who just goes to the app store to find the app.

8] Checker;

Another use of a drone is as a checker. Consider a game where the players are outside, perhaps searching for clues or where there might augmented reality effects shown on their mobile devices. The game requires that the players actually be at specific locations. The game exists on a game server 75 in FIG. 8. The players have the front end, the game app, on their mobile devices. See for example Bob 70 and his mobile device 71 in FIG. 8. But how to enforce the players being at those locations? If the game has a monetary prize there could be incentive for players to cheat. Or even if there is no such prize, the chance of some recognition or even fame could induce cheating.

The basic problem is this. The game app is on a player's device. The app typically gets the location from GPS. Perhaps in addition to also using signals from cellphone towers (aka basestations). The player controls his device. A rogue player could install the app and do an unauthorized mod ("jailbreak") of the app. Or the app is run in an emulator or simulator or software framework where false position information is fed to the app. The problem is fundamental. The game server is communicating wirelessly with what it believes to be valid game apps sending it true information. In a twist on a Turing Test, the server cannot easily if at all tell that the apps are behaving truly.

This section offers a solution. The server hires drone 76 (with its camera 77) from a drone operator. This hiring could be done with some manual steps by a person at the server or perhaps all the hiring steps could be automated at the server. Or equivalently the drone operator works for the company running the server.

The drone is chosen to be close to a given (x, y) location where the players are meant to be or say they are. Thus if there are various drones at different locations, there might be some software that shows these, letting the server (or its human operator) pick an available drone near (x, y) that approaches the immediate area around (x, y).

Figure 8:
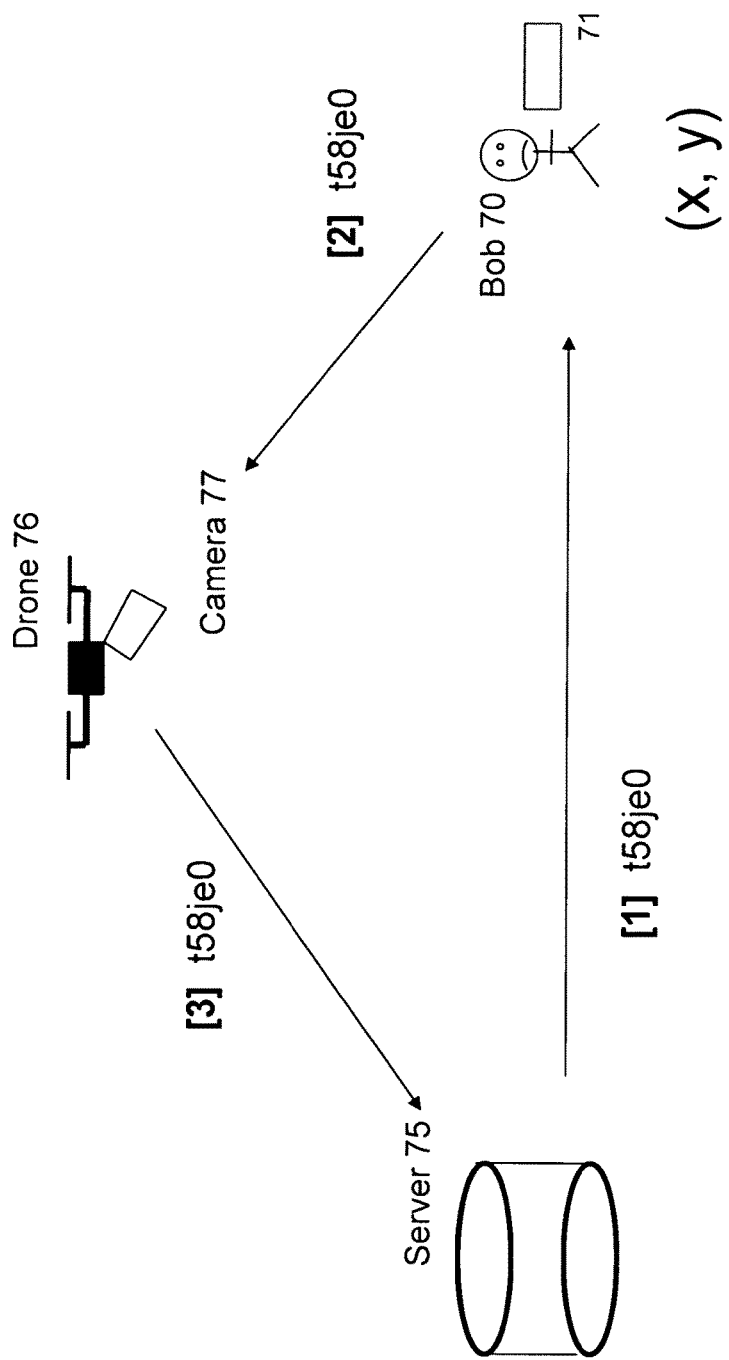
FIG. 8 shows a game using a drone as a checker.

The server could have a programmatic control of the drone, where the server gets a video feed (or some static images) from the drone camera. FIG. 8 omits for simplicity the possible presence of a human at the server or a human operator doing manual control actions for the drone.

The game server is told by Bob's app that he (or more precisely his device 71) is at or near (x, y), where "near" is defined by the game. One method of checking is for the server to tell Bob (via his app) to raise his hand or do some equivalent visually distinctive action. The drone has image recognition methods to detect Bob. Or the images could be passed onto the game server, which has these methods, or which has a human manually looking at the image feed.

A stricter test is shown in FIG. 8. The server sends a pseudo-random string (perhaps called a "nonce") in step [1] to Bob's device 71. The app tells Bob to point the device screen towards the sky. This might also involve telling Bob to orient the screen towards a nearby drone. The latter could presumably be the checker drone 76. The app can automatically show some representation of the string on the screen, in the ways described in earlier sections. So the string might appear as large text or as a barcode.

The drone may get closer to improve its pattern recognition. It uses appropriate decoding methods to take an image of the screen and decode to extract the string, as shown in step [2] of FIG. 8. The drone forwards the string to the server in step [3]. Preferably the drone can also forward images of Bob. Thus the server can check that Bob is indeed at or near (x, y).

Suppose there are several people playing the game and they presumably are near (x, y), as told by their devices to the server. The server could ask some or all of these to do the actions of Bob. If some, it could pick a random subset of the players. In general, the nonce sent to each such player can be different. Note if there are several players nearby, they need not be in a team. They might be present as individuals. And of course around (x, y) there could be people who are not playing the game.

It might not be necessary for the server to check all players near a location. By telling the players beforehand that it will randomly pick a subset to ask can act as a deterrent. A rogue player will risk being detected as not being present to be imaged by the drone, when his game app is telling the server that he is present. Compliance to the game's request to the players would be a requirement of playing the game.

Figure 8A:
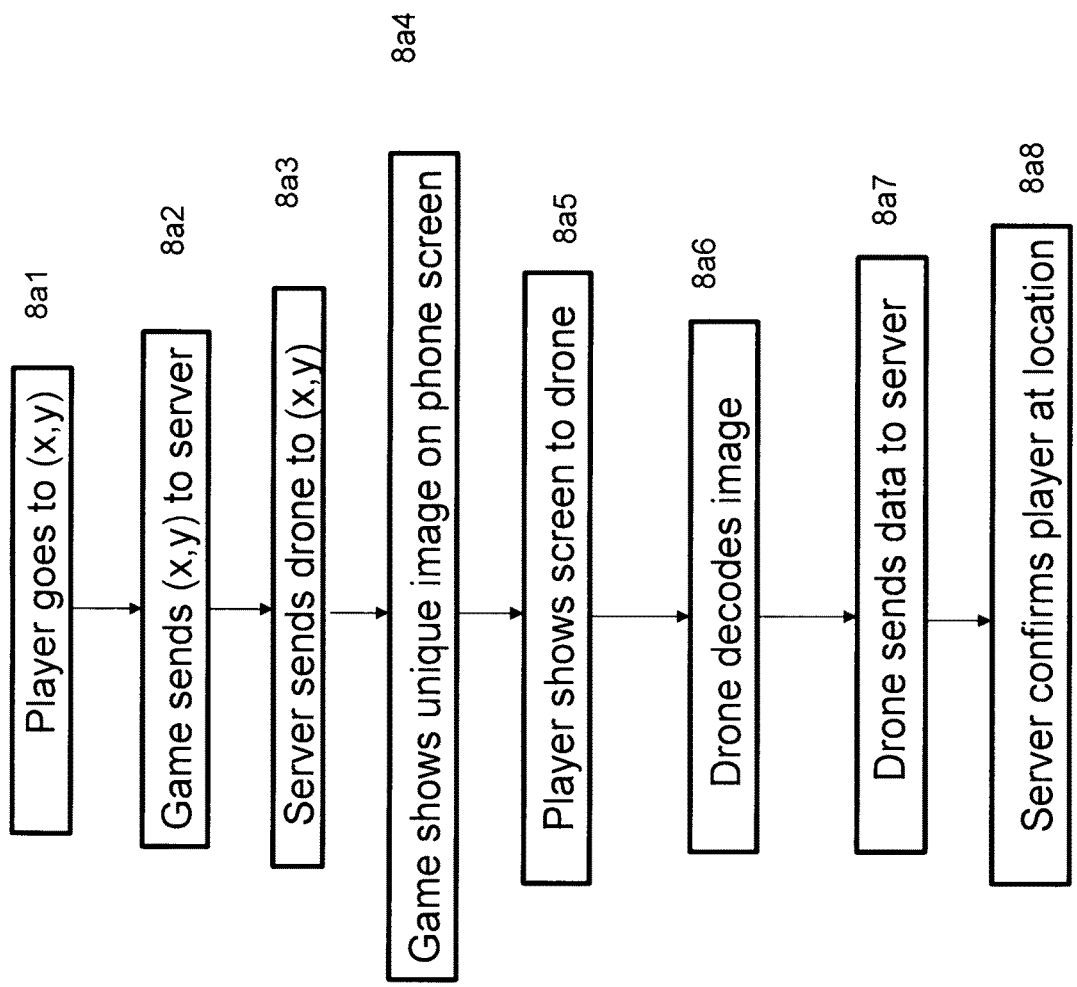
FIG. 8a is a flow chart of the checker.

FIG. 8*a* is a flow chart of the drone being used as a check. Item 8*a*1 is the player going to some location (x,y). This may be some special location in the game on his phone. Item 8*a*2 is the game sending the location to the game server. Item 8*a*3 is the game server sending the drone to (x,y) to check up on the player. Item 8*a*4 is the server telling the game to show some unique image on the player's phone screen. This may or may not involve using the nonce. In either case item 8*a*5 is the player showing the phone screen to the drone. Item 8*a*6 is the drone decoding the image. Item 8*a*7 is the drone sending the decoded data to the game server. Item 8*a*8 is the server confirming (or not) that the player has been visually verified to be at (x,y).

The method of this section also has a benefit of giving a revenue source to drone operators. Which increases the probability that such operators will be near places of interest to the game.

Another benefit of this method is to reduce a different cheating mode where Bob has 2 mobile devices, each with a copy of the game app. He runs one device as one player and the other device as a second player. The game might prohibit this. Perhaps Bob does this to try to win 2 prizes. Bob runs the risk of being detected if both "players" are asked by the game to show nonces to the drone. The capturing of Bob's image can reveal this.

It can also work across different locations. At one (x, y), one of Bob's players was asked to show the nonce. Bob did so, and the server gets an image of Bob. Later at a different location, his other (fake) player is randomly chosen by the server and asked to show a (different) nonce to the drone. His real image is taken and sent to the server. The server can have image recognition that recognises that the images taken of ostensibly different players at different locations are in fact the same person.

The method is different from and has advantages over a human alternative where the game has a human checking players near a location. The latter has practical difficulties. The game has to find non-player humans to be checkers. Consider such a human checker, Sue. If the area around (x, y) is large, she has to go near players or they have to come to her. This takes time and impacts the game experience for the real players. Whereas a drone can travel faster than Sue across the area and can check more players in the same amount of time.

Plus Sue has to be trained in the specifics of the game checking steps. Whereas for using the drone, much or all can be automated. Even if the drone operator manually supervises the drone, she in general does not need to know the specifics of the checking steps.

Another use of the drone by the game company is to check the presence (or absence) of physical entities altered or placed by players. Suppose the game involves players putting a special flag in a location inside a park. If a player does so, the game tells her to take a photo of it at the location. Perhaps with her or other players in the photo. And possibly the photo might have the location coordinates and timestamp written into it by her phone. But a rogue player can modify the image and metadata. A drone could fly by the location later and take a photo of the flag if it is there, as a check.

9] Drone Delivery of Virtual Items;

There has been much work in recent years on the use of drones to deliver physical goods to customers. Amazon and Google, for example, have made tests and filed patent applications on this subject. In contrast, this section of the submission argues that drone delivery of virtual items has several advantages. The virtual items are bit strings that are delivered to mobile devices of customers, typically in open areas.

First, there is less total mass of the drone plus the item. The latter as a bit string is essentially massless. This means that a given drone has a longer range and flight time. Or a smaller, cheaper drone could be used to deliver bit strings.

Second, it is safer. In case of collision with another object, or compared with a drone dropping a physical item by parachute.

Third, the drone is more likely to make multiple deliveries. Meaning it can deliver data to several customers on the ground. Consider what it means when the drone has to deliver a physical item. In most cases it has to return to base to pick up another item. The return trip means an empty drone. Granted, because it is lighter, the trip can take less time. But still, approximately, the drone has a duty cycle of 50%.

Fourth, there is less chance of the drone being stolen. Compared to when a drone lands on the ground to deliver a physical item. The drone delivering data wirelessly to a customer can stay in the air and out of reach of people.

Fifth, there is less chance of the delivered item being stolen. When a physical item is left at a customer location, if the customer is not present, the item could be stolen.

This section has argued 'why' for delivery of bit strings. The next section describes 'how' and offers 2 use cases.

10] Distribute Prizes or Keys;

This section closely follows the scenario of section 8. The drone can be used at an outdoor location to distribute prizes or points in a game to players nearby. The server has the app tell the players that the drone they see nearby is run by the game. They are also told that if they, for example, do something in the app that then displays a unique image on the screen, and they hold up the screen to the drone, then it will be scanned. The image can decode to a unique identifier of the player holding the phone. This id might be the player's name (or handle) in the game. Or a temporary unique id assigned to the player for just this task.

The game then awards some prize or points in the game to those players scanned by the drone. It can be seen that while the motivation differs from section 8, operationally the steps are similar. The current section is akin to a carrot approach, while section 8 is a stick approach.

In related ways, suppose the app and its server is not restricted to a game. For a general encrypted interaction between users, or between users and a server, a common problem is how to disseminate a key to a cryptosystem to the users. The cryptosystem will do the encryption and decryption. A drone can be used to spread the keys. See FIG. 1. Jill is the operator of the drone. At some earlier time she physically has the drone near her, on the ground. She can put keys into the drone in several ways. Each key is a bit string. The keys might be on a memory chip which she inserts into a slot on the drone. The keys can be read by the drone operating system when it is airborne. Or Jill plugs a cable from her controlling computer 102 to the drone, or 102 makes a wireless connection. In the latter case it can be safely assumed that eavesdropping is unlikely. She and the drone might be in a closed shielded room for example. And the wireless transmission might be at low power because device 102 and the drone are next to each other.

A given key could be for user Bob. Bob uses the app to tell the server where he is. The drone is nearby and is told by the server that a user nearby is that user Bob. The app tells Bob to raise his device screen, where the app is showing some image encoding some id of Bob. The drone gets near, decodes the image and checks that the id is that of Bob. The drone transmits by various means the key. By complementary means the app on Bob's device gets the device to receive the key.

One method is for the drone to modulate a visible light signal. The drone can have a light that can be used for this. Given that the total size of the key is small, a relatively low bandwidth modulation will suffice. The light could have other unrelated uses. Bob's device (often a cellphone) would use its camera to record and decode.

Other parts of the electromagnetic spectrum might be used. Perhaps for a Bluetooth transmission. Or a WiFi transmission.

In this way, the key never travels on the electronic network (typically the Internet) between the server and Bob. Note importantly that Bob is never required to have earlier met in person anyone from the company running the server and (temporarily) controlling the drone.

But what if the transmission is detected by others near Bob? First, one case is where Bob is by himself. If others are near, Bob might have the option to tell the app that the drone should not transmit until he is elsewhere. Or the app can let Bob define a seed for a simple encryption of the key by the drone. Or the app can define the seed itself. Given that the key is likely to be a pseudo-random bit sequence, then encrypting it in the latter simple way can most likely throw off nearby eavesdroppers. When the drone transmits the encrypted key to Bob's device, his app can decode using the known seed and extract the key.

The main idea is that the drone acts as an out of channel mechanism for crucial data to be transmitted to a user.

11] Drone Pickup of Virtual Items;

If a drone can deliver (virtual) items, it can also pick up (virtual) items. This section is a corollary to the previous section. It is another difference from drone delivery of real items. For the latter there is little discussion of a corresponding use of a drone to pick up a physical item. Perhaps in part due to practical difficulties of how a drone might be outfitted to carry a relatively unknown item supplied by a stranger. These could be a chance of the drone being stolen or damaged if it lands. Or the item might be attached wrongly and then drop from the drone when airborne.

For the pickup of a virtual item (i.e. data) none of these problems occur. The drone can remain airborne near the person, Bob, from which it is picking up. One case can be for gaming, and specifically for a scavenger hunt. Bob is outdoors and does certain actions in the game. After this, his game app makes some data acccording to various inputs. One input could be his location. Another input could be the time. For example, he might need to do the tasks in minimum time; perhaps racing against other players to finish the tasks first. His game app makes the data. By assumption, the app is in wireless contact with the game server. The app could just transmit the data to the server to mark that Bob has done the tasks.

Instead, the game requires Bob to "send" the data to a drone near him. He might have to wait for the drone; perhaps it is busy servicing other players at this or other locations.

When the drone nears, he could do steps like described in earlier sections. He might raise his phone, screen facing away from him, and showing some visual signal. There are at least 2 possibilities. One is that the drone images Bob, but the data is sent from his phone to the server. The drone never gets the data. Here, as in earlier sections, the drone is used to get a photo of Bob at a place. This could be a key condition of the game.

In a second case, the data is transmitted wirelessly from Bob's device to the drone. This could be via an image or video on his device screen. The data could be encoded as a barcode or sequence ("video") or barcodes. The data could be played as audio. Etc. In this case, the game might include a nonce (random bit string) sent from the server to his device. The nonce would be put into the signal sent to the drone. This tries to ensure that if say there are several people near Bob, that the drone is getting data from the real Bob.

While the second case clearly has the drone picking up data, the first case does not. But in the terminology of the submission, we consider the first case to also be a drone "pickup". The drone acts as the enabler, in the eyes of the end user.

Figure 9:
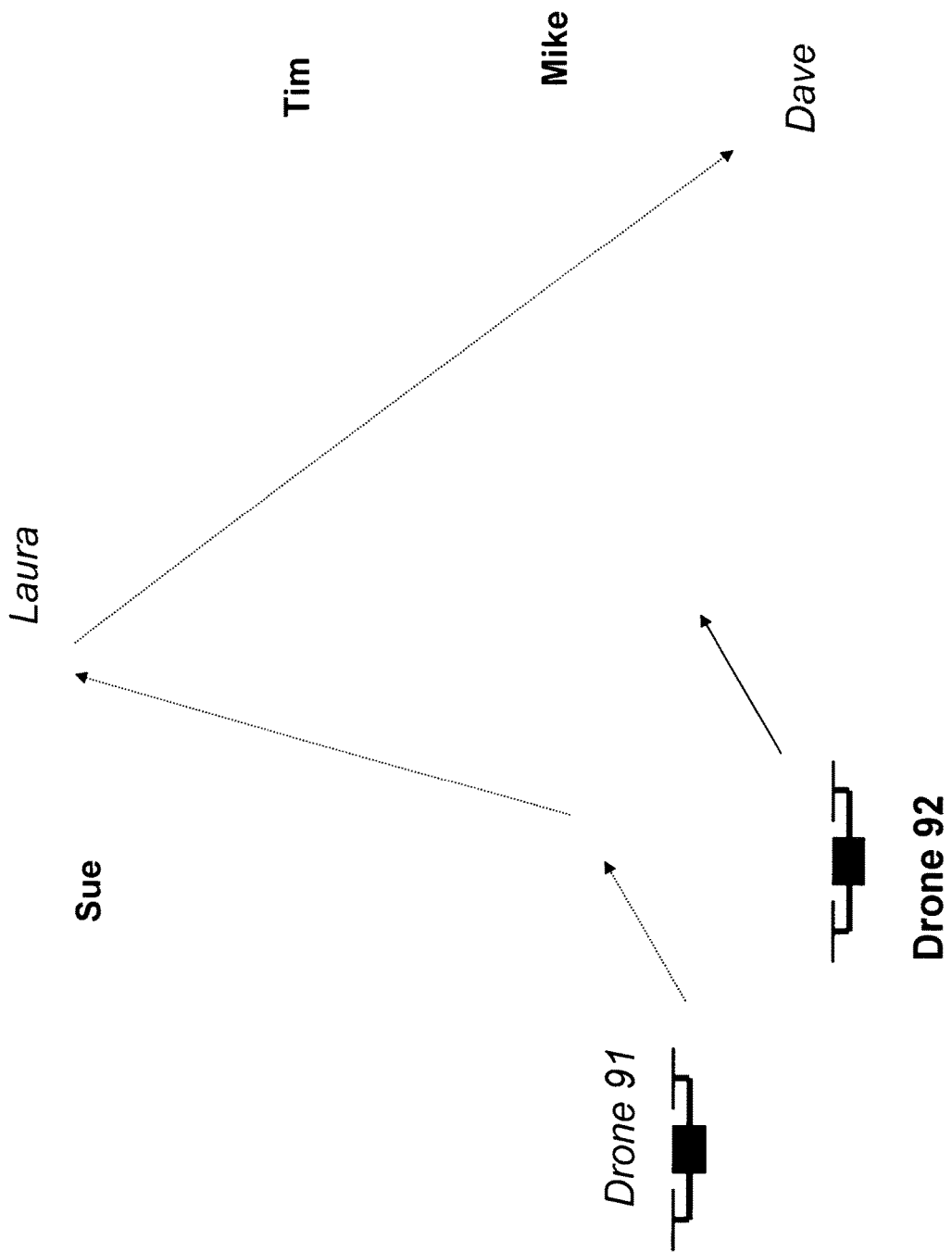
FIG. 9 shows 2 drones delivering or picking up data.

12] Drone-drone Interactions;

See FIG. 9. There is Drone 91 and Drone 92. Each has a different human operator. Or one or both might be entirely machined operated. In either case, they might be owned and operated by different legal entities. Following the previous sections, the drones are tasked with going to different locations and checking the presence of users of some apps (game or otherwise). They might be delivering data (keys to cryptosystems or game prizes). Or they could be picking up data. Drone 91 might be delivering data while drone 92 could be picking up data. Or both drones might, perhaps coincidentially be delivering data. Or both could be picking up data.

In the general area there are 5 users at different locations, Sue, Laura, Tim, Mike, Dave. Drone 91 is tasked to go to where Laura and Dave are. For visual clarity FIG. 9 shows "Drone 91" and "Laura" and "Dave" in italics. Likewise drone 92 is tasked to go to where Sue, Tim and Mike are. These labels are shown in bold to aid understanding. Neither drone necessarily knows any names of these users. Rather, each drone could be given the coordinates of those users. The dashed lines for 91 show a possible trajectory for it to service Laura and Dave.

FIG. 9 can be for the case where the users are calling for drone pickup. Each user uses her app to call its server to get a drone. Or for the case where a drone is perhaps to check for the physical presence of users at a given location, then imagine Sue being replaced by "South west corner of Central Park". In this case the drone, the drone server and the app server might not know whether any players are at that location or not.

Laura and Dave might be using the same app or different apps. Likewise Sue, Tim and Mike could be using the same app, or 2 different apps or 3 different apps.

Consider when the drones get their orders from the same drone scheduling company. The latter could be akin to a ridesharing firm like Lyft or Uber. And the drone operators (assuming both to be human) might be akin to human drivers of cars who sign up with the firm. The company can reassign workloads to optimise (in this case minimise) the distances travelled by each drone. For example, drone 91 now has to go to the locations of Laura and Sue. While drone 92 goes to Tim, Mike and Dave's locations.

The drone server differs from the app servers. The latter might contract with the drone server to do various location-based actions like those discussed above.

Now suppose the drones are with different drone server firms. Route optimisation is still possible. One way is for the firms to exchange route information between their servers. A second method is for a drone to have pattern recognition of other drones. If drone 91 comes closely enough to drone 92, 91 could look for a drone serial number or logo on 92. There might be a requirement, like for ships and planes, for drones to have such information in a standard format on the fuselage. 91 can look up data on 92. The data could include an electronic address and a means (e.g. by some industry API) for 91 and 92 to exchange routes and negotiate to swap destinations in a mutually beneficial way.

This negotiation could be done manually by the drone operators. Or partly or entirely computationally.

The above discussed a relatively simple optimisation of distance travelled for each drone. Implicit was the expectation that the time in interacting at each location is (roughly) the same. This does not have to be true. The interaction time might differ for different apps. Hence the optimisation could be of the time needed for each drone, where the time is both the travel time and interaction time.

A further factor is the remaining flight time for each drone. Suppose 91 is short on fuel. It can only go to Sue's location. Then its route is altered to just Sue, while 92 visits all the other locations. This of course assumes that 92 has enough fuel to do so.

A key property of this section is that the use of drones to carry or get virtual data is essential in making the steps feasible.

13] Blimp;

In the US civilian blimps are often used at major sporting events. The blimps hover over large crowds. Typically a blimp has a corporate logo and possibly an electronic billboard on which is shown advertising.

A blimp can be used with drones. The blimp might be a platform from which drones are launched and to which they return, perhaps to recharge or refuel before flying again. Or the drones might come from normal ground based sites. These are not mutually exclusive. A blimp could have drones from both origins.

A property of the earlier uses of drones in this submission is that a drone lacks a screen on which messages can be shown to users on the ground. But if a blimp has a screen, it can show messages pertaining to how to use or interact with the drones. For example, the screen might show a website URL (presumably short) or enough of a description so a user could use her phone to go to the webpage or go to the app store and get the app. In either case, the page or app lets her interact with a nearby drone. The interaction offers something extra than merely downloading and running an app. The app could be related to the outdoor event, or to another outdoor activity. And she could get bonus points if she interacts with the drone.

The blimp screen could show data or information about the users who interact with the drones. For example, a drone might take a photo of a user who interacted with it (in the manner of steps in this submission). This photo can be sent to the blimp screen, as incentive for users to interact with the drones.

The blimp screen can show a running tally of how many users nearby have interacted with the drones. If this number reaches some set amount, then all such users could get a bonus in the app or page. This acts as incentive for others watching to participate, to get what is in effect a group discount. This feedback loop is a gamification of the interaction between the blimp, its drones and the users; separate from whether the app or page in question is for a game.

Figure 10:
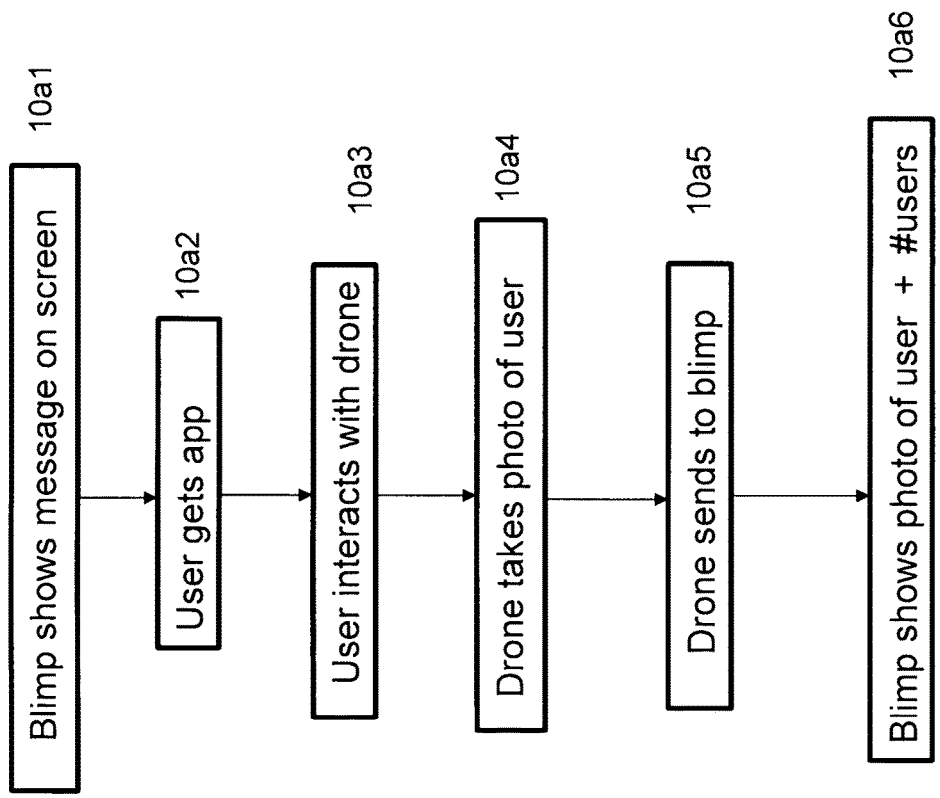
FIG. 10 is a flow chart of a blimp and drone.

FIG. 10 is a flow chart of a blimp and drone interacting with users on the ground. Item 10a1 is the blimp showing a message on its screen. The message can tell the user how to get a particular app from an app store. Item 10a2 is the user getting the app and running it on her phone. Item 10a3 is the user running the app and interacting with the drone. The app could have an option to summon the drone, and the app gives the game server its device location. The game server then forwards this to the drone. (Perhaps via a blimp server or drone server.)

Item 10a4 is the drone taking a photo of the user and her phone screen. Here, the app may have made a unique image that is shown on the phone screen. Item 10a5 is the drone sending that image to the blimp. This can be via the drone sending it to the drone server, which sends it to the game server, which sends it to the blimp. Item 10a6 is the blimp showing the user's image on the blimp screen. Along with possibly a running total of how many people have installed and run the app.

Variants of FIG. 10 and the last 2 paragraphs are possible. For example, the paragraphs and FIG. 10 assume that the user installs the app via information from the blimp screen, so that when the drone approaches the user, she already has the app on her device. Clearly, one variant uses the steps in section 1, where the user puts her electronic address (like her phone number) on her screen and she raises her screen. A drone approaches and scans and gets her address. It tells the game server, which sends a message to her address with, for example, a linket or deep link for the app.

Separate from this is another way the blimp can be used. It can have a camera that shows images of the crowd. The images can be used to direct drones to cover as much of the crowd as possible. Plus, suppose that the drones have been used for some time and users have interacted and downloaded and are running an app publicised by the blimp and drones.

Suppose the app gets the location of the mobile device that it runs on. The crowd images from the blimp can be combined with the distribution of the app users for further guidance for the drones. A drone could be directed to a portion of the crowd that has relatively few instances of the app. The directions to the drone can be done by the drone server if it gets the crowd images from the blimp. Or the blimp can have a server doing this, if that server gets the app locations from the app server. And if the blimp server can direct the drones (which it likely can).

The steps of the previous 2 paragraphs are independent of whether the blimp has an electronic billboard or whether that billboard is used as suggested earlier in this section.

Instead of or in addition to using the billboard, the blimp could use other methods to inform the crowd. It might have a Bluetooth transmitter that transmits a signal. A person on the ground decodes it. The signal tells how to interact with the drones. Or the blimp could have a WiFi hotspot. Which may or may not connect to the Internet. In either case a person connecting to the hotspot via her phone might see instructions on accessing the drone.

14] Billboard;

The previous section discussed in part the use of a blimp having an electronic billboard. This section describes the use of a stationary electronic billboard. The billboard can be in a permanent fixed location, like by a road, on or on top of a building. It can be in a temporary fixed location. For example, it might be on a flatbed truck driven to a location with many pedestrians nearby. Like in front of a movie theatre, nightclub, restaurant, convention center or stadium. The billboard is controlled by a computer. The computer has Internet access.

There are 1 or more drones flying near the crowd. The billboard shows instructions explaining how a pedestrian with her cellphone or other mobile device can interact with a drone. The interaction can be by the various means described earlier. The billboard can also show a running tally of how many pedestrians have interacted with the drones. Perhaps just for informational purposes. But this could also be a gamification to induce more people who have not yet done so to interact with the drones.

The interaction can be via a user installing and running an app. Perhaps via getting and using a deep link or linket from a drone or equivalently from a drone controller.

The drone controller can be different or be the same as the billboard controller. The billboard controller might control some drones nearby, while other drones nearby are under the separate control of drone controllers. This may be for scenarios where in large crowds, the drones of the billboard controller are inadequate to meet the demands of the crowd. So the billboard controller calls in (i.e. hires) other drones.

The gamification could be where users who interact with the drones and get the app are encouraged to recruit others nearby. Perhaps if enough download and use the app, all in the vicinity of the billboard get extra credits or compensation (monetary or not). A volume discount.

The recruiting by someone, Sheila, who interacted with a drone does not necessarily require that her recruited friend, Tim, interact with a drone. For example, suppose Tim's friend Sheila is nearby and she did interact. When she runs the app, it can encourage her to send installation information (perhaps in the form of a deep link or linket that points to the app in an app store) to friends. Sheila already has Tim's electronic address, so she forward him the information and he does the install and runs the app.

A generalisation is that Tim might not even be near Sheila and the billboard. The app can decide whether to require that Tim be nearby or not. If there is such a requirement, the app can (try to) enforce this by using the location information from Tim's phone. Tim's location is not verified by the drone. This might not matter to the app firm. They might just want more users.

If the billboard shows a running tally of how many users have interacted with the drones, this could include users near other billboards. There might be a promotional campaign across several outdoor locations in a city, or in different cities, at the same time. One reason for the tally to be computed this way is to get large numbers shown on the billboard. To encourage more group participation.

The use of multiple billboards can include a billboard on a blimp, where the latter was described in the previous section. Or billoards on several blimps.

Digital signage in shop windows can also be used in addition to or in place of billboards.

I claim:

1. A method of an airborne drone interacting with a person on the ground, the method comprising:
   possessing, by the drone, a camera;
   detecting, by the drone, the orientation of the camera;
   detecting, by the drone, a mobile device held by the person;
   scanning, by the drone, using the camera, a screen of the mobile device;
   decoding, by the drone, a scanned image,
   decoding, by the drone, an electronic address associated with the mobile device;
   sending, by the drone, a message to the address;
   interacting, by the drone, with the mobile device, via receiving and transmitting electronic messages to the address;
   renting, of the drone, to the person;
   decoding, by the drone, using Optical Character Recognition, the image.

2. A method of an airborne drone interacting with a person on the ground, the method comprising: possessing, by the drone, a camera; detecting, by the drone, the orientation of the camera; detecting, by the drone, using image recognition, the person holding the mobile device in an upraised arm; maneuvering, by the drone, to image the screen; detecting, by the drone, a visual signal from the screen, decoding, by the drone, the visual signal.

3. A method of an airborne drone interacting with a person on the ground, the method comprising:
   possessing, by the drone, a camera;
   detecting, by the drone, the orientation of the camera;
   detecting, by the drone, a mobile device held by the person;
   receiving, by the drone, one or more wireless signals from the mobile device;
   decoding, by the drone, from the wireless signals, an electronic address associated with the mobile device;
   sending, by the drone, a message to the address;
   interacting, by the drone, with the mobile device, via receiving and transmitting electronic messages to the address;
   renting, of the drone, to the person;
   where the signal is a phone number; using, by the drone, an automated assistant to interact with the phone number.

4. A method of an airborne drone interacting with a person on the ground, the method comprising:
   possessing, by the drone, a camera;
   detecting, by the drone, the orientation of the camera;
   detecting, by the drone, a mobile device held by the person;
   receiving, by the drone, one or more wireless signals from the mobile device;
   decoding, by the drone, from the wireless signals, an electronic address associated with the mobile device;
   sending, by the drone, a message to the address;
   interacting, by the drone, with the mobile device, via receiving and transmitting electronic messages to the address;
   renting, of the drone, to the person;
   where the signal encodes a phone number; sending, by the drone, a text message to the phone number.

5. A method of an airborne drone interacting with a person on the ground, the method comprising:
   possessing, by the drone, a camera;
   detecting, by the drone, the orientation of the camera;
   detecting, by the drone, a mobile device held by the person;
   receiving, by the drone, one or more wireless signals from the mobile device;
   decoding, by the drone, from the wireless signals, an electronic address associated with the mobile device;
   sending, by the drone, a message to the address;
   interacting, by the drone, with the mobile device, via receiving and transmitting electronic messages to the address;
   renting, of the drone, to the person;
   where the signal is a deep link; the deep link having an identifier of an application in an app store; using the application, by the drone, to interact with the mobile device.

6. The method of claim 5, the deep link having an identifier of an Internet address of the mobile device; using the Internet address, by the drone, to send messages to the app.

7. A method of an airborne drone interacting with a person on the ground, the method comprising:
   possessing, by the drone, a camera;
   detecting, by the drone, the orientation of the camera;
   detecting, by the drone, a mobile device held by the person;
   receiving, by the drone, one or more wireless signals from the mobile device;
   decoding, by the drone, from the wireless signals, an electronic address associated with the mobile device;
   sending, by the drone, a message to the address;
   interacting, by the drone, with the mobile device, via receiving and transmitting electronic messages to the address;
   renting, of the drone, to the person;
   receiving, by the drone, a linket in the signal; where the linket is a Unicode string; sending, by the drone, the linket to a server; receiving, by the drone, from the server, a deep link having an identifier of an application in an app store; using, by the drone, the app to interact with the mobile device.

8. A method of an airborne drone interacting with a person on the ground, the method comprising:
   possessing, by the drone, a camera;
   detecting, by the drone, the orientation of the camera;
   detecting, by the drone, a mobile device held by the person;
   receiving, by the drone, one or more wireless signals from the mobile device;
   decoding, by the drone, from the wireless signals, an electronic address associated with the mobile device;

sending, by the drone, a message to the address;
interacting, by the drone, with the mobile device, via receiving and transmitting electronic messages to the address;
renting, of the drone, to the person;
sending, by the drone, a message having a deep link; the deep link having an identifier of an application in an app store; interacting, by the drone, with an instance of the application running on the mobile device.

* * * * *